United States Patent [19]
Sugiyama et al.

[11] Patent Number: 5,272,379
[45] Date of Patent: Dec. 21, 1993

[54] POWER SUPPLY DEVICE FOR AN ELECTRIC VEHICLE

[75] Inventors: Takeshi Sugiyama; Shinji Nishimura, both of Himeji, Japan

[73] Assignee: Mitsubishi Denki K.K., Tokyo, Japan

[21] Appl. No.: 926,656

[22] Filed: Aug. 10, 1992

[30] Foreign Application Priority Data

Sep. 26, 1991 [JP] Japan .................... 2-76615
Oct. 9, 1991 [JP] Japan .................... 2-90603

[51] Int. Cl.$^5$ .................... B60L 11/08; F02N 11/04
[52] U.S. Cl. .................... 290/45; 290/8; 290/22; 290/46
[58] Field of Search .................... 290/10, 17, 22, 31, 290/45, 46, 8; 322/10, 11, 12

[56] References Cited

U.S. PATENT DOCUMENTS 3,786,696  1/1974  Aleem .................... 290/46
4,099,589  7/1978  Williams .................... 290/45
4,306,156  12/1981  Monoco et al. .................... 290/17

FOREIGN PATENT DOCUMENTS 2-92556  12/1990  Japan .

Primary Examiner—Howard L. Williams
Assistant Examiner—Robert Lloyd Hoover
Attorney, Agent, or Firm—Sughrue, Mion, Zinn Macpeak & Seas

[57] ABSTRACT

A power supply device for electric vehicle. The power supply device includes an engine, transmission, generator-motor, power converting circuit, battery and alternating drive motor. In operation, the battery supplies a direct current to the power converting circuit which converts the direct current to an alternating current which is supplied to the generator-motor to start the engine. Thereafter, the generator-motor acts as a generator so as to generating an alternating current which is supplied to the drive motor via the power converting circuit. Additionally, the power converting circuit converts the alternating current to a direct current for recharging the battery. According to another embodiment of the invention, a rectifier is provided for converting the alternating current of the generator-motor to a direct current which is supplied to the storage battery and to a direct current load. Additionally, an inverter converts the direct current voltage from the storage battery and the direct current voltage from the rectifier into an alternating current. A switch alternatively connects the output side of the converter to a first side of the generator motor in starting the engine and to a second side of the alternating current driving motor after the engine has started.

4 Claims, 4 Drawing Sheets

FIGURE 3A     FIGURE 3B
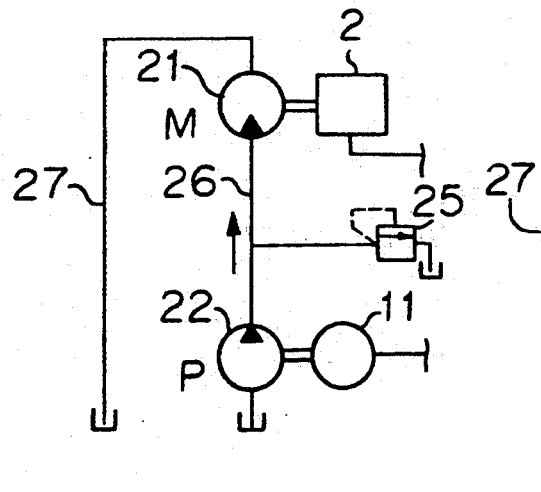
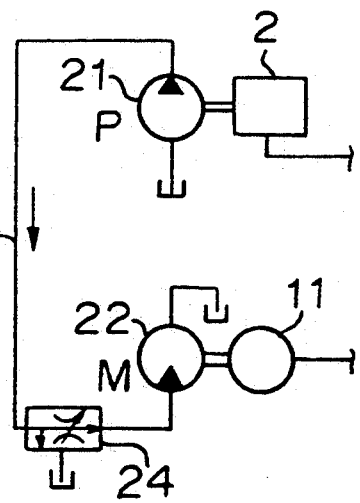
FIGURE 4
PRIOR ART
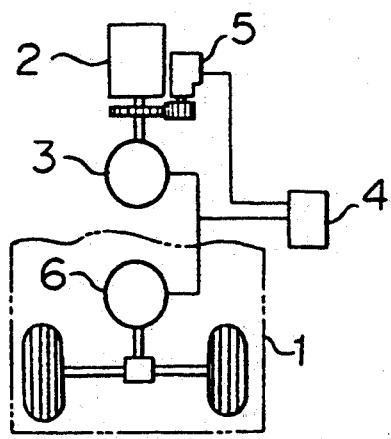

POWER SUPPLY DEVICE FOR AN ELECTRIC VEHICLE

This invention relates to a power supply device for an electric vehicle for generating power by rotating a generator by an engine, and for rotating a driving motor by the power.

FIG. 4 is a block diagram of a conventional power supply device for an electric vehicle such as a hybrid-type electric car. A reference numeral 1 designates an electric vehicle unit, 2, an engine composing a prime mover, 3, a generator rotated by the engine 2 by a gear means, 4, a storage battery charged by the power of the generator 3, and 5, a starting motor composed of a direct current motor for starting the engine 2 which is rotated by the storage battery 4 as a power supply source. A numeral 6 designates a driving motor composed of a direct current machine for running the electric vehicle unit 1, which is rotated by receiving the power of the generator 3.

The engine 2 is driven at a predetermined revolution speed to achieve high efficiency and low exhaust gas emission. Accordingly, the generator 3 has to be driven at a revolution speed which is lower than an appropriate revolution speed. Therefore, the size thereof is magnified.

As stated above, in the conventional power supply device for an electric vehicle, the generator 3 is driven by the engine 2 through the gear means. Therefore the speed-increasing ratio cannot be enhanced and the outer size of the generator 3 is magnified. A large space for occupation is required for mounting the device on a vehicle. Furthermore, since the driving transmission of the generator 3 is performed by the gear means, the repair and maintenance thereof are troublesome. Furthermore, since the starting motor 5 and the driving motor 6 are provided with commutators and brushes, the repair and maintenance thereof are very troublesome.

FIG. 6 is a circuit diagram of another conventional power supply device for an electric vehicle such as a hybrid-type electric car. A reference numeral 101 designates a three-phase alternating current generator-motor, which is coupled with an engine of a vehicle. When an alternating current power is supplied, the generator-motor rotates as a starting motor, and starts the engine. After the engine is started, the generator-motor is rotated by the engine and supplies an alternating current power as a generator. A numeral 102 designates a three-phase armature winding of a stator, and 103, a field winding of magnetic poles of a rotor. A numeral 104 designates a three-phase alternating current driving motor which runs the vehicle when an electric current power is supplied to rotate the motor. A numeral 105 designates a three-phase armature winding of a stator, and 106, a field winding of magnetic poles of a rotor. A numeral 107 designates a storage battery, and 108, a first inverter, which is integrated by a plurality of transistors 109 and a plurality of diodes 110 composing switching elements. When the engine is to be started, the inverter converts a direct current voltage of the storage battery 107 into a three-phase alternating current voltage, which is supplied to the generator-motor 101. After the engine has been started, and the generator-motor 101 is driven to generate a three-phase alternating current voltage, the plurality of diodes 110 becomes a rectifier, for rectifying the alternating current voltage and outputting a direct current voltage. A numeral 111 designates a second inverter, which is integrated with a plurality of transistors 112 and a plurality of diodes 113 composing switching elements. When the second inverter is supplied with an output of a direct current voltage of a rectifier unit composed of the plurality of diodes 110 of the first inverter 108, the second inverter converts the direct current voltage to a three-phase alternating current voltage and supplies it to the driving motor 104.

In the second conventional device, first, in starting the engine, the inverter 108 converts the direct current voltage of the storage battery 107 to the three-phase alternating current voltage, which is supplied to the generator-motor 101. The generator-motor 101 becomes a starting motor for starting the engine. When the engine has been started, the generator-motor 101 is driven to rotate, becomes a generator and generates a three-phase alternating current voltage. This three-phase alternating current voltage is rectified by the plurality of diodes 110 of the inverter 108, and the direct current voltage is outputted which is supplied to the inverter 111 and storage battery 107. The direct current voltage which is supplied to the inverter 111 is converted to a three-phase alternating current voltage, which is supplied to the alternating current driving motor 104 and rotates it. By this driving and rotating of the alternating current motor 104, the vehicle is operated.

In the above second conventional power supply device for an electric vehicle, since the first inverter 108 is required to supply a large current when the engine is to be started, the size and the weight thereof are magnified. Furthermore, the second inverter 111 is necessary for running the vehicle. Accordingly, the device is magnified and weight thereof is increased, which makes it expensive.

It is an object of the present invention to provide a power supply device for an electric vehicle wherein a single machine is utilized both for a generator and for a starting motor, the size thereof is downsized, a space for mounting on a vehicle thereof is reduced, and the repair and maintenance thereof is simplified.

It is an object of the present invention to provide a power supply device for an electric vehicle wherein a single inverter is utilized both for supplying power to a starting motor when an engine is started, and for supplying power to an alternating current driving motor when the engine is running, the device thereof being downsized and inexpensive.

According to an aspect of the present invention, there is provided a power supply device for an electric vehicle comprising:

a generator-motor comprising a brushless alternating current machine;

an engine for driving to rotate the generator-motor;

a speed increasing and decreasing transmission means which connects the engine with the generator-motor;

an alternating current driving motor for running a vehicle;

a storage battery as a power supply source for a direct current load and for a starting motor in starting the engine; and a power converting circuit;

wherein, in starting the engine, the storage battery supplies an alternating current voltage to the generator-motor through the speed increasing and decreasing transmission means and rotates the generator-motor as a motor and the speed increasing and decreasing transmission means decreases a first speed of the generator-motor, thereby starting to rotate the engine; and in generating power, the speed increasing and decreasing transmission means increases a second speed of a driving revolution of the engine and rotates the generator-motor as an alternating current generator which supplies a generated alternating power to the alternating current driving motor through the power converting circuit thereby driving to rotate the alternating current driving motor and running the vehicle, and a direct current converted by the power converting circuit charges the storage battery.

According to another aspect of the present invention, there is provided a power supply device for an electric vehicle comprising:

a generator-motor connected to an engine for starting the engine as a starting motor in starting the engine and for generating a first three-phase alternating current voltage as an alternating current generator by being rotated by the engine after the engine is started;

an alternating current driving motor for running a vehicle;

a storage battery as a power supply source for a direct current load and for starting the engine;

a rectifier for rectifying the first three-phase alternating current voltage of the generator-motor after the engine is started and supplying a direct current voltage to the storage battery and the direct current load;

an inverter for converting a direct current voltage from the storage battery and the direct current voltage from the rectifier into a second three-phase alternating current voltage; and a changeover switch for switching and connecting an output side of the inverter to a first side of the generator-motor in starting the engine and to a second side of the alternating current driving motor after the engine is started.

In the first aspect of this invention, in starting the engine, the power output by the storage battery is converted into the alternating current power by the power converting circuit, the generator-motor is rotated as a motor, and the speed of the generator-motor is decreased by the speed increasing and decreasing transmission means, thereby starting to rotate the engine. When the engine is started and rotated, the speed of the engine is increased by the speed increasing and decreasing translation means, thereby driving to rotate the generator-motor, and generating the alternating current power. This alternating current power is converted to a direct current power and the direct current power is again converted to an alternating current power by the power converting circuit. By this alternating current power, the alternating current driving motor is driven to rotate which runs the electric vehicle. On the other hand, the other portion of the alternating current power by the generator-motor, is converted into the direct current by the power converting circuit, for charging the storage battery.

Furthermore, in the second aspect of this invention, the changeover switch is switched to the generator-motor side when the engine is to be started, the direct current voltage of the storage battery is converted to the three-phase alternating current voltage by the inverter which is supplied to the generator-motor for rotating as a starting motor. When the engine has been started, the changeover switch is switched to the alternating current driving motor side. The generator-motor is rotated as a generator, and the three-phase alternating current voltage is rectified to the direct current voltage by the rectifier, which is supplied to the inverter and the storage battery. The direct current voltage supplied to the inverter is converted to the three-phase alternating current voltage, which is supplied to and rotate the alternating current driving motor, thereby running the vehicle.

In the drawings:

FIGS. 3A and 3B are block diagrams showing operation of a hydraulic equipment of FIG. 2 in starting and in generating power;

FIG. 4 is a block diagram showing construction of a conventional power supply device for an electric vehicle;

Figure 1:
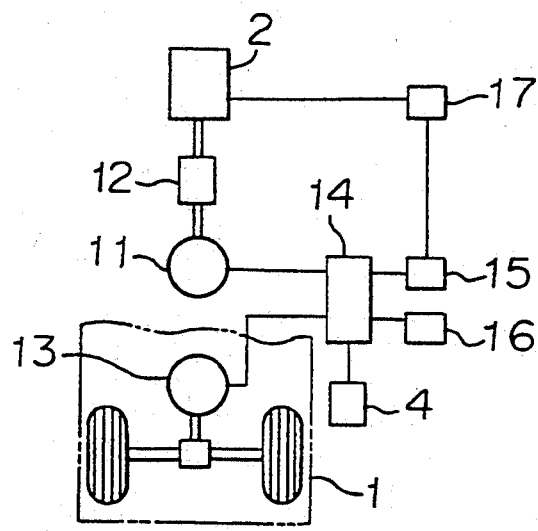
FIG. 1 is a block diagram showing construction of a first embodiment of a power supply device for an electric vehicle.

FIG. 1 is a block diagram showing a first embodiment of a power supply device for an electric vehicle according to the present invention. A reference numeral 11 designates a brushless generator-motor, which rotates as a starting motor when an alternating current power is supplied, and supplies an alternating current power as a generator when it is driven to rotate. A numeral 12 designates a speed increasing and decreasing transmission means which connects an engine 2 with the generator-motor 11, which is, for instance, a planetary gear device. This speed increasing and decreasing transmission means 12 decreases a speed of revolution of the generator-motor 11 as a starting motor and transmits the revolution to the engine. Furthermore, in power generating, the speed increasing and decreasing transmission means increases a speed of revolution of the engine 2 and transmits the revolution to the generator-motor 11, thereby generating an alternating current power. Furthermore, in case of the planetary gear device, when the respective gears are composed of helical gears, a noise thereof is reduced. A reference numeral 13 designates a brushless alternating current driving motor which is driven to rotate by the alternating current power of the generator-motor 11, and runs the electric vehicle 1, and 14, a power converting circuit interposed among the generator-motor 11, the driving motor 13 and the storage battery 4, having a plurality of diodes, which converts a multi phase alternating current to a direct current. Furthermore, the power converting circuit 14 has an inverter for converting a direct current to a multi-phase alternating current. A numeral 15 designates a power generating control circuit which has the generator-motor 11 perform a power generating operation when it is driven to rotate, and also orders the power converting circuit 14 to convert an alternating current to a direct current thereby charging the storage battery 4. A reference numeral 16 designates a starting control circuit. When the generator-motor 11 is driven to rotate as a starting motor, the starting control circuit 16 orders the power generating control circuit 14, so that a direct current of the storage battery 4 is converted to an alternating current which is supplied to the generator-motor 11 and starts to rotate it. A numeral 17 designates an engine control circuit for controlling an output of the engine in accordance with an output of the generator-motor 11 controlled by the power generating control circuit 15.

In the above embodiment of the power supply device, in starting the engine 2, by the order of the starting control circuit 16, a direct current power of the storage battery 4 is converted to an alternating current power through the power converting circuit 14, which is supplied to the generator-motor 11 for rotating it as a starting motor, the speed of the generator-motor 11 is decreased by the speed increasing and decreasing transmission means 12, and the torque is increased to a value which is inversely proportional to the speed reduction ratio, thereby starting to rotate the engine 2.

When the engine 2 has been started, the speed of the revolution is increased by the speed increasing and decreasing transmission means 12, and the generator-motor 11 is driven to rotate. The generator-motor 11 operates as an alternating current generator, and drives to rotate the alternating current driving motor 13 through the power converting circuit 14 by the order of the power generating control circuit 15, thereby running the vehicle. On the other hand, a direct current from the power converting circuit 14 is supplied to the storage battery 4 for charging it.

Figure 2:
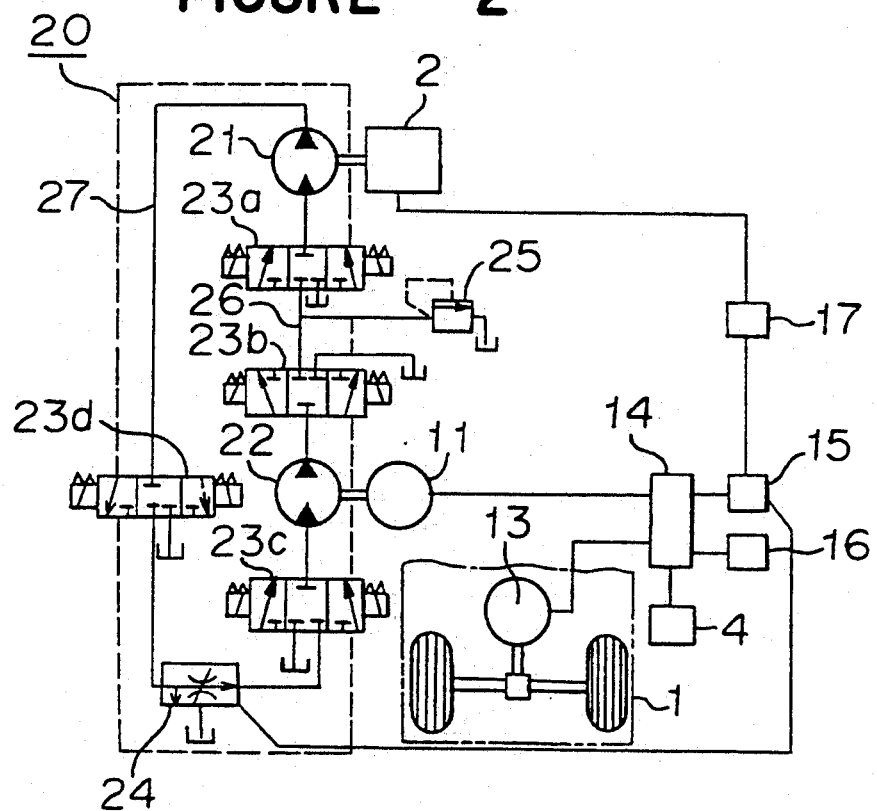
FIG. 2 is a block diagram showing construction of a second embodiment of a power supply device for an electric vehicle.

FIG. 2 shows a second embodiment of a power supply device for an electric vehicle according to the present invention. Notations 1, 2, 4, 11, and 13 to 17 are the same as in FIG. 1. The speed increasing and decreasing transmission means 20 provided between the engine 2 and the generator-motor 11, is composed of a hydraulic equipment. A reference numeral 21 designates a one-way rotating type first hydraulic pump-motor directly connected to the engine 2, 22, a one-way rotating type second hydraulic pump-motor directly connected to the generator-motor 11, 23a and 23b, switching valves attached to an oil feeding pipe 26 provided between an outlet of the second hydraulic pump-motor 22 and an inlet of the first hydraulic pump-motor 21, 23c and 23d, switching valves attached to an oil feeding pipe 27 provided between an outlet of the first hydraulic pump-motor 21 and an inlet of the second hydraulic pump-motor, 24, a flow control valve with pressure compensation interposed between the switching valves 23c and 23d, and 25, a pressure control valve interposed between the switching valves 23a and 23b.

FIG. 3A shows an operation of the hydraulic equipment when the engine 2 is started, also showing a direction of the switching valves. An alternating current power from a power supply source of the storage battery 4 through the power converting circuit 14, rotates the generator-motor 11 as a motor, which drives to rotate the hydraulic pump-motor 22 as a hydraulic pump (P). The first hydraulic pump-motor 21, supplied with pressurized oil by a hydraulic pump action, rotates as a hydraulic motor (M) at a decreased speed, thereby starting to rotate the engine 2.

FIG. 3B shows an operation of the hydraulic equipment when the engine 2 has been started and the generator-motor 11 operates as an alternating current generator, also showing a direction of the switching valves. By the driving rotation of the engine 2, the hydraulic pump-motor 21 operates as a hydraulic pump (P), supplies pressurized oil to the hydraulic pump-motor 22 passing through the oil feeding pipe 27, by which the hydraulic pump-motor 22 is rotated as a hydraulic motor (M) at an increased speed. With the increased-speed driving rotation by the hydraulic pump-motor 22, the directly-connected generator-motor 11 is rotated, which operates as an alternating current generator, and supplies an alternating current power to the alternating current driving motor 13 through the power converting circuit 14, thereby running the vehicle 1. On the other hand, the other portion of the alternating current by the generator-motor 11, is converted to a direct current by the power converting circuit 14, for charging the storage battery 4.

The hydraulic pump-motors 21 and 22 are switched to have functions of a hydraulic motor driven by a hydraulic pump and a hydraulic pump for driving a hydraulic motor, respectively, when the engine 2 is started and when power is generated. Assuming a capacity of a hydraulic pump of the hydraulic pump-motor 21 is equal to a discharge quantity per revolution $q_1$ cc/revolution, and a capacity of hydraulic pump of the hydraulic pump-motor 22 is equal to a discharge quantity per revolution $q_2$ cc/revolution, normally $q_1 = k \times q_2$, where k is a constant $>1$ and $q_1 > q_2$.

In this way, by using the hydraulic equipment as the speed increasing and decreasing transmission means 20, and by setting the hydraulic pump capacity as $q_1 = k \times q_2$, the generator motor 11 has a speed decreasing ratio in starting, and a speed increasing ratio in generating power, with respect to the speed of the engine 2. Accordingly, the generator-motor 11 can be downsized. Furthermore, since the speed increasing and decreasing transmission device is driven by hydraulic pressure, it is possible to provide the hydraulic equipment at a pertinent place in the vehicle by arranging the oil feeding pipes, thereby promoting a degree of freedom for mounting thereof. Furthermore, the device can dispense with an operating noise between a pinion of the starting motor and a ring gear of the engine as is conventionally generated. Furthermore, in addition to a field control of the generator-motor 11, the device is provided with a speed control by the oil quantity control, thereby promoting the controllability and performing an optimum control. The field of the generator-motor 11 may be a permanent magnet.

As stated above, according to the present invention, the brushless generator-motor is connected to the engine through the speed increasing and decreasing transmission means. In starting, the direct current from the storage battery is converted to the alternating current, which is supplied to the generator-motor for rotating it as a motor. The speed of the generator-motor is reduced and the engine is started to rotate. In generating power, the speed of the driving rotation of the engine is increased by which the generator-motor rotates as an alternating current generator. The alternating current power generated by this generator rotates the alternating current driving motor, thereby running the vehicle. Furthermore, the alternating current of the generating power is converted to the direct current for charging the storage battery. Accordingly, the generator-motor is utilized both for an alternating current generator and a starting motor which is downsized by interposing the speed increasing and decreasing transmission means, thereby promoting the freedom thereof for mounting on a vehicle. Furthermore, the generator-motor can dispense with brushes and, and the commutators for means is not necessary, thereby simplifying the repair and the maintenance thereof. Furthermore, when the field of the generator-motor is composed of a permanent magnet, it dispenses with a field loss, thereby promoting a power generating efficiency.

Figure 5:
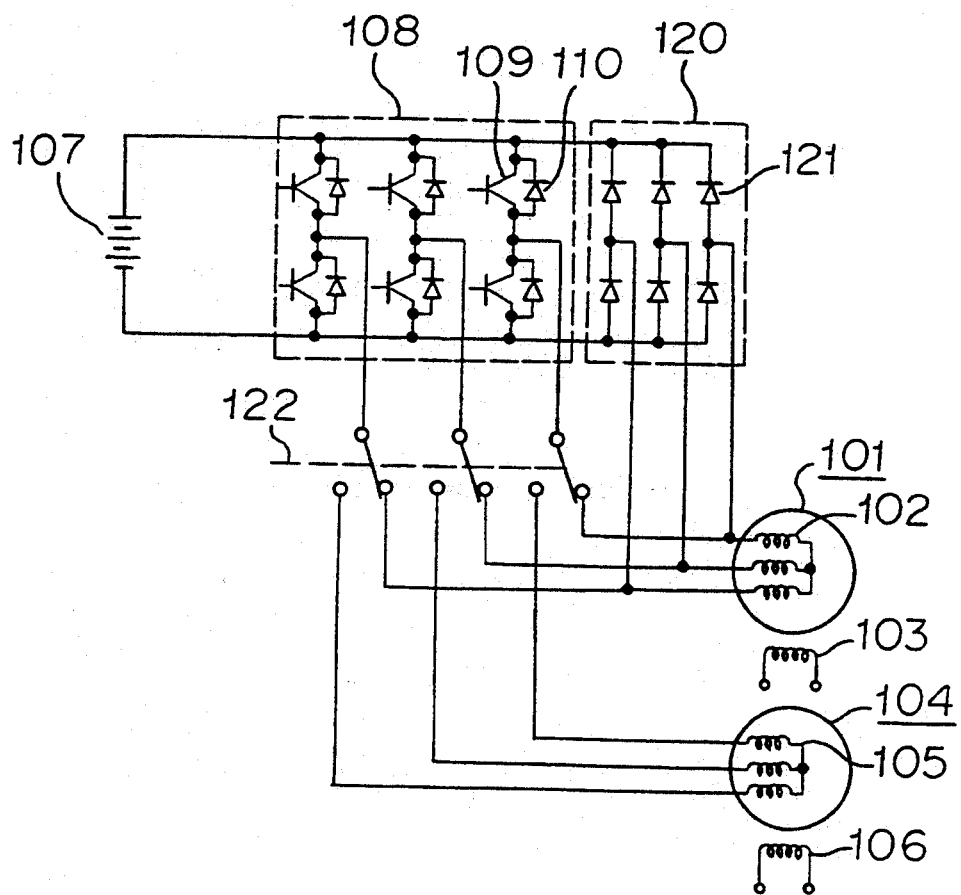
FIG. 5 is a circuit diagram showing a third embodiment of a power supply device for an electric vehicle.
Figure 6:
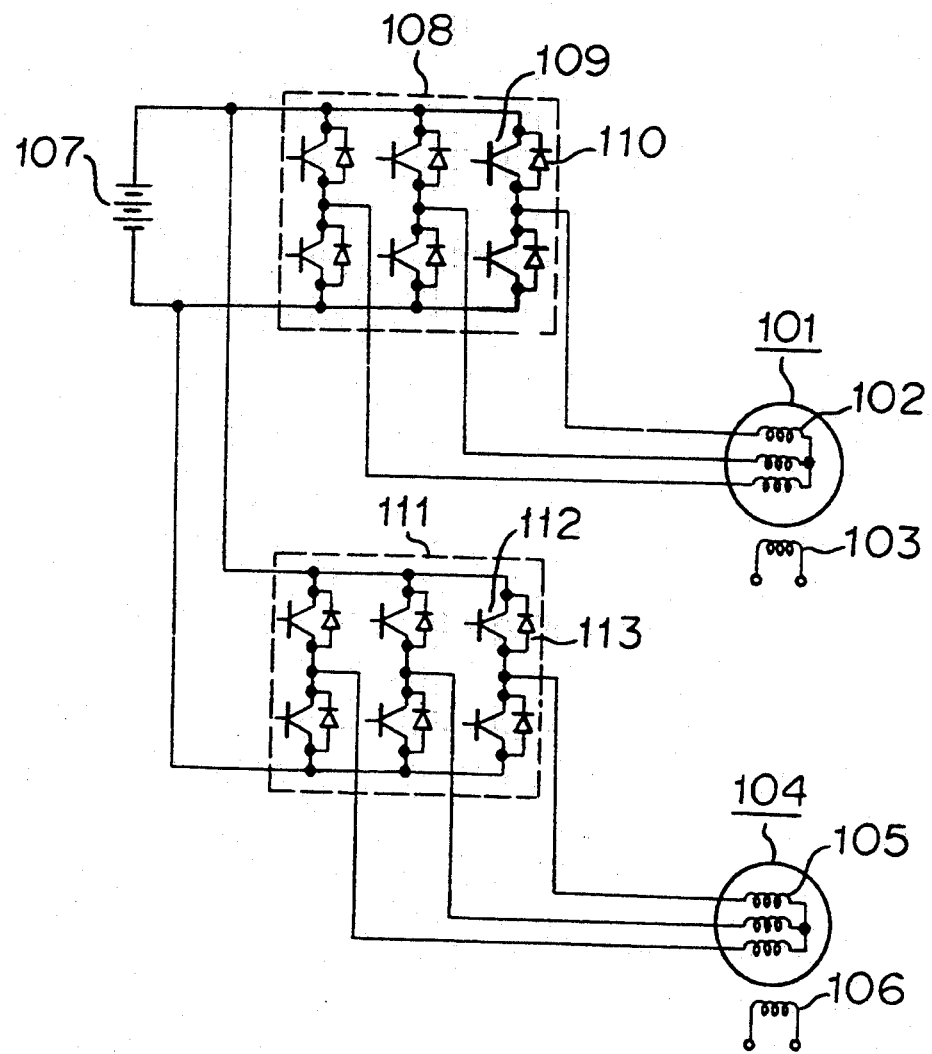
FIG. 6 is a circuit diagram showing a conventional power supply device for an electric vehicle.

FIG. 5 is a circuit diagram showing a third embodiment of the invented device. The notations 101 through 110 are the same as in FIG. 6. The inverter 108 is utilized both for starting and for running. A numeral 120 designates a rectifier integrated with a plurality of diodes 121, which rectify a three-phase alternating current voltage generated by driving to rotate the generator-motor 101 to a direct current voltage, and supplies it to the inverter 108 and the storage battery 107. A numeral 122 designates a changeover switch for switching the connection from the output side of the inverter 108 to the armature winding 102 of the generator-motor 101 and to the armature winding 105 of the alternating current driving motor 104.

Next, explanation will be given to the operation. First, in starting, the changeover switch 122 is switched to the side of the generator-motor 101. Then, a direct current voltage of the storage battery 107 is converted to a three-phase alternating current voltage by the inverter 108, which is supplied to the generator-motor 101. The generator-motor 101 becomes a starting motor and starts the engine. When the engine has been started, the changeover switch 122 is switched to the side of the alternating current driving motor 104. The generator-motor 101 is driven to rotate by the engine and generates a three-phase alternating current voltage as a generator, and the alternating current voltage is rectified to a direct current voltage by the rectifier 120. The direct current voltage is supplied to the inverter 108 and the storage battery 107. The direct current voltage supplied to the inverter 108 is converted to a three-phase alternating current voltage, which is supplied to the alternating current driving motor 104. In this way, the alternating current driving motor 104 rotates and runs the vehicle.

As stated above, according to the present invention, the output side of the inverter for converting the direct current voltage of the rectifier connected to the output side of the generator-motor and the direct current voltage of the storage battery, to the three-phase alternating current voltage, is switched to connect to the side of the generator-motor in starting, and the side of the alternating current driving motor in running by the changeover switch. Accordingly, the single inverter is utilized in both ways, and therefore, the device is downsized and is inexpensive.

I claim:

1. A power supply device for an electric vehicle, comprising:
   a generator-motor comprising a brushless alternating current machine;
   an engine for driving the generator-motor;
   a speed increasing and decreasing transmission means interconnecting the engine with the generator-motor;
   an alternating current driving motor for running the vehicle;
   a storage battery acting as a power supply source for generating a direct current voltage; and
   a single power converting circuit;
   wherein, in starting the engine, the storage battery supplies said direct current voltage to said power converting circuit which converts said direct current voltage to an alternating current voltage which is supplied to the generator-motor and rotates the generator-motor as a motor and the speed increasing and decreasing transmission means decreases a first speed of the generator-motor, thereby rotating the engine; and
   in generating power, the speed increasing and decreasing transmission means increases a second speed of a driving revolution of the engine and rotates the generator-motor as an alternating current generator which supplies a generated alternating power to the alternating current driving motor through the power converting circuit thereby rotating the alternating current driving motor and attendantly running the vehicle, and a direct current converted by the power converting circuit charges the storage battery.

2. The power supply device for an electric vehicle according to claim 1, wherein the speed increasing and decreasing transmission means is composed of a planetary gear device.

3. The power supply device for an electric vehicle according to claim 1, wherein the speed increasing and decreasing transmission means is composed of a hydraulic equipment having a first hydraulic pump-motor directly connected to the engine, a second hydraulic pump-motor directly connected to the generator-motor, and a plurality of switching valves inserted in oil feeding pipes of the first and the second hydraulic pump-motors.

4. A power supply device for an electric vehicle comprising:
   a generator-motor connected to an engine for starting the engine as a starting motor in starting the engine and for generating a first three-phase alternating current voltage as an alternating current generator by being rotated by the engine after the engine is started;
   an alternating current driving motor for running a vehicle;
   a storage battery as a power supply source for a direct current load and for starting the engine;
   a rectifier for rectifying the first three-phase alternating current voltage of the generator-motor after the engine is started and supplying a direct current voltage to the storage battery and the direct current load;
   a single power converting circuit including an inverter for converting a direct current voltage from the storage battery and the direct current voltage from the rectifier into a second three-phase alternating current voltage; and
   a changeover switch for switching and connecting an output side of the inverter to a first side of the generator-motor in starting the engine and to a second side of the alternating current driving motor after the engine is started.

* * * * *